(12) United States Patent
Chmielewski

(10) Patent No.: US 6,624,251 B1
(45) Date of Patent: Sep. 23, 2003

(54) HIGHLY CHEMICALLY RESISTANT THERMOPLASTIC VULCANIZATES BASED ON FLUOROCARBON POLYMERS AND SEAL-GASKET PRODUCTS MADE WITH SAME

(75) Inventor: Craig A. Chmielewski, Wixom, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 09/597,050

(22) Filed: Jun. 20, 2000

Related U.S. Application Data

(60) Provisional application No. 60/168,414, filed on Dec. 1, 1999.

(51) Int. Cl.$^7$ .............................................. C08L 27/12
(52) U.S. Cl. ...................... 525/199; 524/544; 524/545
(58) Field of Search .......................... 525/199; 524/544, 524/545

(56) References Cited

U.S. PATENT DOCUMENTS 5,354,811 A * 10/1994 Kamiya et al. ............. 525/200
6,160,053 A * 12/2000 Enokida et al. ............ 525/199

* cited by examiner

Primary Examiner—Peter D. Mulcahy
(74) Attorney, Agent, or Firm—Ronald W. Wangerow

(57) ABSTRACT

Disclosed are new fluid resistant, in particular resistant to chemically basic compounds, for example those compounds containing amines, and exceptional processing fluorine containing thermoplastic vulcanizate compositions comprising a continuous phase of at least one melt-formable thermoplastic fluorocarbon resin and a disperse phase consisting of a blend of at least two vulcanizable fluorine containing elastomers with at least one of the fluoroelastomers being a terpolymer of vinylidene fluoride/tetrafluoroethylene/propylene. The vinylidene fluoride/tetrafluoroethylene/propylene fluoroelastomer comprises between 5 and 95 weight percent of the total dispersed elastomer phase, which the total disperse elastomer phase comprises from between 40 and 90 weight percent based on the total amount of the continuous phase and the disperse phase combined.

20 Claims, No Drawings

HIGHLY CHEMICALLY RESISTANT THERMOPLASTIC VULCANIZATES BASED ON FLUOROCARBON POLYMERS AND SEAL-GASKET PRODUCTS MADE WITH SAME

This application claims the benefit of applicant's earlier provisional application No. 60/168,414 filed Dec. 1, 1999.

FIELD OF INVENTION

The present invention relates to fluorine containing thermoplastic vulcanizate ("TPV") compositions comprising a continuous thermoplastic fluorocarbon resin phase and a dispersed amorphous vulcanized fluorine containing elastomer phase, which is useful as a melt formable material having rubber elasticity. Further it relates to a process for producing a fluorine containing thermoplastic vulcanizate composition, which comprises melt blending the above mentioned thermoplastic fluorocarbon resin and the non-vulcanized amorphous fluorine containing elastomer, followed by dynamically vulcanizing this blend to form chemically cross-linked elastomer particles dispersed in the thermoplastic fluorocarbon resin.

The compositions of this invention have the highly desirable property of low compression set, that is when articles made of the composition are compressed for long periods of time, even at high temperatures, they have a strong tendency to return to their original size and shape. Another advantage is that articles made from the composition of this invention are highly fluid resistant, even to fluids containing chemically basic components, such as large or small molecules containing primary, secondary or tertiary amines. Articles molded from the composition of the present invention can find use as seals and gaskets in applications where high temperatures and harsh chemical environments are common, for example in certain types of automotive or aerospace applications.

BACKGROUND OF THE INVENTION

A two phase composition comprising a continuous phase thermoplastic material and a disperse phase elastomer, produced by dynamically vulcanizing the elastomer while the discrete phase elastomer is dispersed in the continuous phase thermoplastic material, is known, for example, in Coran et al. U.S. Pat. Nos. 4,348,502, 4,130,535, 4,173,556, 4,207,404 and 4,409,365.

Fluorocarbon resins and fluorine containing elastomers are excellent in heat resistance, and a two phase blend obtainable by a combination of these materials, is considered to be excellent in heat resistance as well. Such a fluorine containing two phase blend is discussed by Pazos and Rees in EP patent 168020. The elastomer used is substantially a vinylidene fluoride/hexafluoropropylene elastomer, and as its vulcanization method, polyol vulcanization by a combination of bisphenol AF, an acid receiving agent and an onium salt, or peroxide vulcanization by a combination of an organic peroxide and a polyfunctional unsaturated compound, is employed.

The compounds disclosed in EP 168020 require oven vulcanization (post cure) following dynamic vulcanization. By only dynamically vulcanizing the materials the mechanical properties tend to be inadequate, particularly the permanent strain. In addition, following dynamic vulcanization, the compositions also tend to powder, rendering them extremely difficult to subsequently melt process in standard thermoplastic processing equipment. Finally, the compounds of EP 168020A are inherently susceptible to chemical attack and degradation by chemically basic moieties.

To address some of these problems, Kamiya and Saito in U.S. Pat. No. 5,354,811 describe alternate two phase dynamically vulcanized compounds based on fluorocarbon resin continuous phase and a dispersed fluorocarbon elastomer dispersed phase. The fluorine containing elastomers of U.S. Pat. No. 5,354,811 have vulcanizable sites selected from the group consisting of epoxy groups, carboxylic acid groups, carboxylic acid derivative groups, sulfonic acid groups and sulfonic acid derivative groups. These chemically functional cure sites allow vulcanization to proceed quickly and fully in a short period of time. Such materials were shown to have adequate properties without the need of a post cure.

SUMMARY OF THE INVENTION

A major advantage of the present invention is that it operates to compose and produce fluorocarbon based TPV's which solve problems such as TPV powdering upon synthesis, poor melt processing, and poor physical and mechanical properties, without subjection to a post cure processing cycle. Furthermore, it is the intent of the present invention to overcome these problems without resorting to chemically modifying standard commercial fluoroelastomers, or producing fluoroelastomers from their monomer constituents, with special cure site monomers. This invention provides a two phase composition comprised of fluorinated polymers, that is useful as a thermoplastic vulcanizate which is excellent in mechanical properties, excellent in heat resistance, excellent in fluids resistance, including fluids containing basic moieties, and easily melt processible. In addition, a process for its production is disclosed.

It has been found that the desired two phase composition can be obtained by using as the fluoroelastomer component a blend of two or more fluoroelastomers with at least one of the fluoroelastomers being a terpolymer of vinylidene fluoride/tetrafluoroethylene/propylene. The present invention has been accomplished on the basis of this discovery.

DETAILED DESCRIPTION OF INVENTION AND BEST MODE OF THE INVENTION

The present invention provides a fluorine containing thermoplastic vulcanizate composition comprising a continuous phase of at least one melt formable thermoplastic fluorocarbon resin and a dispersed vulcanized elastomer phase containing a blend of two or more fluoroelastomers with at least one of the fluoroelastomers being a terpolymer of vinylidene fluoride/tetrafluoroethylene/propylene. The vinylidene fluoride/tetrafluoroethylene/propylene fluoroelastomer comprises between 5 and 95 weight percent of the total dispersed elastomer phase, while the total dispersed elastomer phase comprises from between 40 and 90 weight percent based on the total amount of the continuous phase and the disperse phase combined.

Further, the present invention provides a process for producing a fluorine containing thermoplastic vulcanizate composition, which comprises a step of melt blending at least one melt formable thermoplastic fluorocarbon resin and at least one fluorine containing elastomer with at least one of the fluoroelastomers being a terpolymer of vinylidene fluoride/tetrafluoroethylene/propylene while exerting a mixing shear force at a temperature higher than the melting point of the thermoplastic fluorocarbon resins.

The present invention is now further described in detail with reference to the preferred embodiments and the best mode.

The thermoplastic fluorocarbon resin useful for the present invention is required to have thermoplasticity, i.e., it is required to be melt formable. Namely, it must be a resin whereby the melt flow or the volume flow rate described in ASTM D-1238, or ASTM D-2116, can be measured at a temperature higher than the melting point. It is preferably a thermoplastic fluorocarbon resin which can be melt formed at a temperature at which there is no problem of deterioration of the fluorine containing elastomer. Among thermoplastic fluorocarbon resins, all fluorocarbon resins except for polytetrafluoroethylene resins which cannot be melt formed, may be employed.

The thermoplastic fluorocarbon resin useful for the present invention is a thermoplastic fluorocarbon resin having a fluorine content of at least 35% by weight, which can be obtained by polymerizing an ethylenically unsaturated compound containing a completely or partially fluorinated fluoroolefin, preferably at least one fluoroolefin selected from the group consisting of tetrafluoroethylene, hexafluoropropylene, trifluoroethylene, vinylidene fluoride, vinyl fluoride, trifluoroethylene chloride and a perfluoroalkylvinyl ether (wherein the alkyl group has from 1 to 8 carbon atoms).

The ethylenically unsaturated compound may, for example, be a non-fluorinated olefin such as ethylene or propylene, an alkylvinyl ether, or a perfluoroalkyl ethylene, in addition to the above olefins.

Preferred among such polymers is a tetrafluoroethylene/hexafluoropropylene/vinylidene fluoride terpolymer, a tetrafluoroethylene/ethylene copolymer, a tetrafluoroethylene/hexafluoropropylene copolymer, a tetrafluoroethylene/perfluoropropylvinyl ether copolymer, a trifluoroethylene chloride/ethylene copolymer, or a vinylidene fluoride polymer. Particularly preferred are a tetrafluoroethylene/hexafluoropropylene/vinylidene fluoride terpolymer and a tetrafluoroethylene/ethylene copolymer. Most preferred is a tetrafluoroethylene/hexafluoropropylene/vinylidene fluoride terpolymer. A plurality of fluorocarbon resins may be used in combination. These copolymers may have other copolymerizable components further copolymerized.

Suitable semi-crystalline fluorine containing thermoplastics are tetrafluoroethylene/hexafluoropropylene/vinylidene fluoride terpolymers which are available under the tradename THV from Dyneon LLC (Oakdale, Minn.), such as grades THV 410, THV 500 and THV 610X, especially the latter. The monomer ratio affects crystallinity, mechanical properties and melt temperature. These grades have fluorine contents in the range of 70 to 76 weight percent and have crystalline melting points of 155° C., 165° C. and 185° C. respectively. As an example of the monomer ratios in these terpolymers, THV410 has as a ratio of tetrafluoroethylene/hexafluoropropylene/vinylidene fluoride of 53/18/29 respectively. Generally an increase in the tetrafluoroethylene in the monomer mix leads to an increase in the crystalline melting point.

The fluorocarbon resin is suitably selected also for the combination with the fluorine containing elastomer which will be described hereinafter. For example, when the fluorocarbon resin for the fluorine containing elastomer is a polymer having vinylidene fluoride units, a polarity will be formed. Accordingly, as a combination of the fluorocarbon resin and the fluorine containing elastomer, it is most desirable to select a combination of the resin and the elastomer both having vinylidene fluoride units to obtain a composition having uniform and excellent physical properties.

The fluorocarbon elastomers required for the present invention are blends of two or more fluorine containing elastomers where at least one of the elastomers is vinylidene fluoride/tetrafluoroethylene/propylene terpolymer. Small amounts of a fourth monomer, such as hexafluoropropylene, may or may not be present. The proportion of the respective monomer units in such terpolymers are optionally selected, taking into account various properties, such as the mechanical properties, heat resistance, low temperature resistance, chemical resistance, oil resistance, etc. For instance, the vinylidene fluoride-tetrafluoroethylene-propylene terpolymer preferably comprises from 2 to 50 mol % of vinylidene fluoride units, from 20 to 60 mol % tetrafluoroethylene units and from 20 to 50 mol % of propylene units.

Further, in such terpolymers, the proportions of the vinylidene units is preferably from 2 to 50 mol %, more preferably from 4 to 40 mol %. If the proportion is too high, there will be drawbacks with respect to the physical properties, such as a decrease in the alkali resistance or in the amine resistance of the terpolymer. On the other hand, if the proportion is too low, the formation of unsaturated bonds will be inadequate, and the effectiveness for the improvement of the curability deteriorates.

Suitable amorphous vinylidene fluoride/tetrafluoroethylene/propylene terpolymers are available under the tradename BRE (Base Resistant Elastomer) from Dyneon LLC (Oakdale, Minn.), such as grades BRE 7131 X, BRE 7132X and BRE 7231 X, especially the first one listed. Also available are Aflas MZ20 1, Aflas SP and Aflas SZ from Asahi Glass Company (Toyko, Japan), particularly Aflas SZ. In addition are DuPont Dow Elastomers, L.L.C. (Wilmington, Del.) materials Viton IBR and TBR, especially Viton TBR. The fluorine content of these terpolymer elastomers is approximately 60 weight percent. Appropriate monomer ratios and the absence, or near absence, of hexafluoropropylene, renders the vinylidene fluoride/tetrafluoroethylene/propylene terpolymers chemically resistant to chemically basic moieties, such as large or small molecules containing primary, secondary or tertiary amines.

The vinylidene fluoride/tetrafluoroethylene/propylene fluoroelastomer comprises between 5 and 95 weight percent of the total dispersed elastomer phase, while the total disperse elastomer phase comprises from between 40 and 90 weight percent based on the total amount of the continuous phase and the disperse phase combined in the material of this invention.

The elastomeric components making up the balance of the dispersed phase are fluorine containing amorphous materials which are known in the art and are commercially available. Suitable elastomeric components include, but are not limited to, copolymers of vinylidene fluoride/hexafluoropropylene, copolymers of tetrafluoroethylene/propylene, copolymers of tetrafluoroethylene/perfluoroalkylvinyl ether, copolymers of vinylidene fluoride/perfluoroalkylvinyl ether, terpolymers of tetrafluoroethylene/vinylidene fluoride/hexafluoropropylene and terpolymers of tetrafluoroethylene/perfluoroalkylvinyl ether/propylene.

The elastomer phase of the composition of this invention may be cured with conventional curing systems known for curing fluoroelastomers, such as, but not limited to, peroxide or Bisphenol AF curing Systems. Two examples are combinations of magnesium oxide/Bisphenol AF/organophosphonium salts, or cumene hydroperoxide/maleimide or triallyl isocyanurate.

The composition of the present invention may contain vulcanization accelerators, fillers, antioxidants, stabilizers, pigments, processing assistants, etc. in an amount at a level of common use.

The particle size of the dispersed phase of the present invention varies depending upon the components of the composition, the proportions of the respective components, the viscosities of the respective components, the production conditions, etc. However, the average particle size is: broadly stated, no larger than about 50 microns, preferably no larger than about 5 microns, and most preferably not larger than 3 microns.

THE PROCESS

The process of the present invention comprises melt blending the thermoplastic fluorocarbon resin and the fluorine containing elastomers at a temperature higher than the melting temperature of the fluorocarbon resin in either batch or continuous mixers, followed by vulcanizing the fluorine containing elastomer while exerting a mixing shear force. The temperature for mixing may be suitably selected depending on the types of thermoplastic fluorocarbon resin and the fluorine containing elastomer used.

It is critical to conduct the vulcanization while exerting a mixing shear force. As the vulcanization is conducted while a mixing shear force is applied, the thermoplastic fluorocarbon resin will form a continuous phase; and a disperse phase, composed of a cured fluorocarbon elastomer, will be uniformly dispersed in the continuous phase. Such a continuous phase will form even when the thermoplastic resin is not the major component. If the continuous and the disperse phase are reversed, that is if the thermoplastic fluorocarbon resin becomes the dispersed phase and the fluorocarbon elastomer and continuous phase, then the material is not melt processible.

The present invention provides a two phase composition comprising a continuous phase thermoplastic material and a disperse phase elastomer, produced by dynamically vulcanizing the elastomer—that is curing the elastomer while it is undergoing shear stress from mixing and after it has been melt mixed with the thermoplastic. A fluorocarbon resin is used as the thermoplastic phase and a blend of two or more fluorine containing elastomers are used as the dispersed elastomeric phase, where at least one of the elastomers is a fluorine vinylidene fluoride/tetrafluoroethylene/propylene terpolymer. The present invention is highly useful as a thermoplastic vulcanizate, excellent in moldability, mechanical properties and fluid resistance, especially to fluids containing chemically basic moieties, such as large or small molecules containing primary, secondary or tertiary amines. The present invention also provides a process for its production.

The following examples explain the present invention, however, in no way should they be taken to limit the scope of the present invention.

All data presented in the following examples were generated using standard ASTM test methods. The hardness test was performed according to ASTM D2240, the tensile properties according to ASTM 412 and the specific gravity according to ASTM D297. Fluid immersion testing was performed according to ASTM D471, and compression set testing according to ASTM D395—Method B.

In addition, test plaques used to die cut test specimens were all prepared by compression molding material for 5 minutes at 254° C. and then cooling under pressure for 10 minutes so the temperature falls below 100° C.

EXAMPLES 1 & 2

Compositions of Examples 1 and 2 illustrate the present invention. The fluoroelastomer FE 5642Q is a copolymer of vinylidene fluoride/hexafluoropropylene containing 65.9 weight percent fluorine and the fluoroelastomer BRE 7131 X is a terpolymer of vinylidene fluoride/tetrafluoroethylene/propylene containing 60 weight percent fluorine. Both fluoroelastomers have a proprietary bisphenol AF type cure system incorporated into materials by the supplier. THV 610X is a thermoplastic fluorocarbon terpolymer of tetrafluoroethylene/vinylidene fluoride/hexafluoropropylene having a crystalline melting point of about 190° C. All three fluorocarbons are commercial products of Dyneon LLC (Oakdale, Minn.).

These compositions were prepared by melt mixing the fluoroelastomers with the fluorocarbon thermoplastic and black filler in a Moriyama mixer for approximately 4 minutes at approximately 220° C. to 235° C. The water and acid scavengers were taken added and mixing continued for 6 minutes while vulcanization proceeded. The final product was solid at room temperature and had good thermoplastic consistency. Compositions and physical properties are shown in below in Table 1.

TABLE

| | EXAMPLES | | |
|---|---|---|---|
| MATERIAL | | 1 wt. % | 2 wt. % |
| Fluorel FE 5642Q | | 36.6 | 42.7 |
| BRE 7131X | | 10.9 | 14.2 |
| THV 610X | | 36.9 | 28.5 |
| Austin Black 325 | | 7.9 | 0.0 |
| Carbon Black N990 | | 0.0 | 8.5 |
| Ca(OH)$_2$ | | 4.3 | 4.0 |
| MgO | | 3.4 | 2.0 |
| Physical Properties | | | |
| Hardness | Shore A | 86 | 80 |
| UTS | Mpa (psi) | 8.27 (1199) | 6.74 (977) |
| EB | % | 266 | 162 |
| M100 | Mpa (psi) | 6.32 (917) | 5.05 (733) |
| Sp. Grav. | | 1.84 | 1.86 |
| Compression Set (70 Hrs. @ 21° C.) | | 28% | N/A |
| Oil Age - IRM 903 70 Hrs @ 125° C. | | | |
| Hardness Change | pts | −4 | 0 |
| UTS Change | % | −16 | −13 |
| EB Change | % | −8 | −30 |
| M100 | % | −17 | +13 |
| Volume Swell | % | +1 | +1 |

EXAMPLE 3 THROUGH 7

Compositions of Examples 3 through 7 illustrate the effect of the ratio of two fluoroelastomers on the final TPV material consistency and physical properties of the present invention (see Table 2). Example 3 is void of the terpolymer vinylidene fluoride/tetrafluoroethylene/propylene, and so represents the prior art. The vinylidene fluoride/hexafluoropropylene copolymer of these examples is the same as that used in Examples 1 and 2 (Fluorel FE 5642Q), while the terpolymer of vinylidene fluoride/tetrafluoroethylene/propylene, BRE 7231 X, is a variation, having slightly higher vinylidene fluoride levels, of the terpolymer used in Examples 1 and 2. E14994 is a non-commercial thermoplastic fluorocarbon terpolymer of tetrafluoroethylene/vinylidene fluoride/ hexafluoropropylene, having a crystalline melting point of about 210° C. Both the BRE 7231 X and E14994 were supplied by Dyneon LLC (Oakdale, Minn.).

Compositions of Examples 3 through 7 were compounded in the same manner as those of Examples 1 and 2, and show good ultimate tensile strength and elongation-at-break (see Table 2). Examples 4 through 7 were solid and continuous at room temperature and had good thermoplastic consistency in the melt state. Example 3, lacking a vinylidene fluoride/tetrafluoroethylene/propylene terpolymer, powdered immediately follow the addition of the cure activator and acid scavenger. A material of the powdery consistency of that of Example 3 does not flow freely and cannot be easily processed on standard thermoplastic processing equipment. Such a result is consistent with the observations made in EP 168020A and demonstrates an advantage of the present invention over the prior art.

TABLE 2

| MATERIAL | | 3 wt. % | 4 wt. % | 5 wt. % | 6 wt. % | 7 wt. % |
|---|---|---|---|---|---|---|
| Fluorel FE 5642Q | | 52.0 | 39.0 | 26.0 | 13.0 | 0.0 |
| BRE 7231X | | 0.0 | 13.0 | 26.0 | 39.0 | 52.0 |
| E14994 | | 34.7 | 34.7 | 34.7 | 34.7 | 34.7 |
| Carbon Black N990 | | 7.8 | 7.8 | 7.8 | 7.8 | 7.8 |
| Ca(OH)$_2$ | | 3.6 | 3.6 | 3.6 | 3.6 | 3.6 |
| MgO | | 1.8 | 1.8 | 1.8 | 1.8 | 1.8 |
| Total | | 100.0 | 100.0 | 100.0 | 100.0 | 100.0 |
| Physical Properties | | | | | | |
| Hardness | Shore A | 87 | 89 | 90 | 90 | 88 |
| UTS | Mpa (psi) | 8.84 (1282) | 7.33 (1064) | 6.77 (982) | 5.61 (813) | 6.55 (950) |
| EB | % | 222 | 235 | 230 | 188 | 159 |
| M100 | Mpa (psi) | 5.29 (767) | 5.31 (770) | 5.16 (748) | 4.94 (716) | 5.19 (753) |
| Sp. Gravity | | 1.91 | 1.89 | 1.87 | 1.84 | 1.82 |

EXAMPLES 8 THROUGH 12

Examples 8 through 12 illustrate retention of physical properties of the materials of Examples 3 through 7 after being soaked for 168 hours at 150° C. in a gear lubricant solution. The solution contains 94 weight percent Anglamol 6055, an automatic transmission fluid (ATF) from Lubrizol (Widkliffe, Ohio) and 6 weight percent Sturaco 7098LO, a high amine containing friction modifier from the D.A. Stuart Company (Warrenville, Ill.).

Table 3 shows excellent retention of physical properties of the materials of this invention (Examples 9 through 12) in an ATF containing a high amine content additive package.

The prior art, represented in Example 8, displays much poorer retention of ultimate tensile strength than the materials of the present invention.

TABLE 3

| | | EXAMPLES | | | | |
|---|---|---|---|---|---|---|
| | | 8 | 9 | 10 | 11 | 12 |
| Physical Properties | | | | | | |
| Hardness Change | pts | +2 | +1 | 0 | −3 | −5 |
| UTS | % | −22.9 | −1.8 | +3.2 | −3.3 | −7.7 |
| EB Change | % | −62 | −68 | −60 | −32 | −25 |
| Volume Change | % | +4.2 | +4.0 | +5.3 | +7.0 | +4.2 |

EXAMPLE 13 THROUGH 16

Compositions of Examples 13 through 16 illustrate the effect on physical properties of varying the fluorothermoplastic loading while keeping the ratio of the two fluoroelastomers, the vinylidene fluoride/hexafluoropropylene and the vinylidene fluoride/tetrafluoroethylene/propylene terpolymer, constant at 1:1. All raw materials of Examples 13 through 16 are the same as those used in Example 3 through 7.

Again, compositions of Examples 13 through 16 were compounded in the same manner as those of Example 1 and 2. Materials of Examples 13 through 16 show good ultimate tensile strength and elongation-at-break and were solid at room temperature and had good thermoplastic consistency. Table 4 shows the material compositions and physical properties. Accompanying a reduction in fluoroplastic loading is a reduction in material hardness, as well as a reduction in tensile strength.

TABLE 4

| | | EXAMPLES | | | |
|---|---|---|---|---|---|
| | | 13 wt. % | 14 wt. % | 15 wt. % | 16 wt. % |
| Fluorel FE 5642Q | | 26.0 | 26.0 | 26.0 | 26.0 |
| BRE 7231X | | 26.0 | 26.0 | 26.0 | 26.0 |
| E14994 | | 34.7 | 30.0 | 25.5 | 21.0 |
| Carbon Black N990 | | 7.8 | 8.4 | 8.9 | 9.4 |
| Ca(OH)$_2$ | | 3.6 | 3.9 | 4.2 | 4.4 |
| MgO | | 1.8 | 2.0 | 2.1 | 2.2 |
| Total | | 100.0 | 100.0 | 100.0 | 100.0 |
| Physical Properties | | | | | |
| Hardness | Shore A | 89 | 86 | 84 | 80 |
| UTS | MPa (psi) | 7.01 (1017) | 6.60 (957) | 5.82 (844) | 4.57 (663) |
| EB | % | 181 | 238 | 235 | 232 |
| M100 | MPa (psi) | 5.35 (776) | 4.92 (714) | 4.21 (611) | 3.32 (482) |
| Sp. Gravity | | 1.87 | 1.86 | 1.84 | 1.83 |

EXAMPLES 17 AND 18

Examples 17 and 18 illustrate the resistance of the materials of the invention of a model automotive fuel. Materials of Examples 4 and 15 are given as Examples 17 and 18 respectively and show good resistance to ASTM Fuel C+10% ethanol at 40° C. for up to 168 hours.

TABLE 5

| | EXAMPLES | |
|---|---|---|
| | 17 | 18 |
| Volume Swell, % | | |
| 22 hrs. | 15 | 27 |
| 70 hrs. | 20 | 30 |
| 168 hrs. | 20 | 30 |
| Weight Gain, % | | |
| 22 hrs. | 6 | 11 |
| 70 hrs. | 8 | 12 |
| 168 hrs. | 8 | 12 |

EXAMPLES 19 THROUGH 21

Examples 19 through 21 further illustrate the resistance of the materials of the invention to a fluid which is particularly aggressive to fluoroelastomers. These examples give the volume swell and weight gain of materials soaked in methanol for 72 hrs at 21° C. Example 19 is a standard fluoroelastomer compound based on FE 5642Q (100 phr FE 5642Q, 30 phr carbon black N990, 3 phr MgO, 6 phr Ca(OH)$_2$ and 1 phr Struktol WS280). Example 20 and 21 are the materials of Examples 4 and 15 respectively. A comparison of the two materials of the invention (Examples 20 and 21) with that of the thermoset rubber compound (Example 19) indicates vastly improved fluid resistance of the compositions of the invention to methanol.

TABLE 6

| | EXAMPLES | | |
|---|---|---|---|
| | 19 | 20 | 21 |
| Volume swell, % | 116 | 45 | 43 |
| Weight gain, % | 49 | 19 | 18 |

EXAMPLES 22 THROUGH 26

Compositions of Examples 22 through 26 illustrate the effect on physical properties of variations in filler level as well as fluoroelastomer dipolymer grade used as part of the rubber phase.

TABLE 7

| MATERIAL | | 22 wt. % | 23 wt. % | 24 wt. % | 25 wt. % | 26 wt. % |
|---|---|---|---|---|---|---|
| FE 5640Q | | 0.0 | 41.8 | 21.5 | 0.0 | 44.3 |
| FE 5642Q | | 41.8 | 0.0 | 21.5 | 44.3 | 0.0 |
| BRE 7231X | | 13.9 | 13.9 | 14.3 | 14.8 | 14.8 |
| E14944 | | 30.0 | 30.0 | 30.9 | 31.8 | 31.8 |
| Carbon Black N990 | | 8.4 | 8.4 | 5.7 | 3.0 | 3.0 |
| Ca(OH)$_2$ | | 3.9 | 3.9 | 4.0 | 4.1 | 4.1 |
| MgO | | 2.0 | 2.0 | 2.0 | 2.1 | 2.1 |
| Total | | 100.00 | 100.00 | 99.9 | 100.1 | 100.1 |
| Physical Properties | | | | | | |
| Hardness | Shore A | 87 | 88 | 85 | 84 | 86 |
| UTS | Mpa | 7.6 | 7.7 | 6.9 | 6.6 | 6.9 |
| EB | % | 176 | 165 | 178 | 225 | 181 |
| M100 | Mpa | 5.6 | 6.0 | 5.3 | 4.5 | 5.2 |
| Comp. Set (70 hrs @ 125° C.) | % | 56 | 69 | 68 | 72 | 67 |
| Methanol Resistance (70 hrs @ 21° C.) | | | | | | |
| Volume Swell | % | 55 | 49 | 54 | 61 | 53 |
| Weight gain | % | 23 | 21 | 23 | 25 | 22 |

The TPV of this invention is believed to have particular utility in fuel systems, especially for automotive applications. Possible applications are in automotive fuel tank sealing, or sealing and gasketing, of the various components associated with the fuel system, such as fuel valves. In addition, since the material is thermoplastic it can be extruded as well as injection molded. This opens possibilities for use as a hose material or a component of a hose (cover, inner layer, etc. . . .), including fuel system hoses.

There are now described three additional articles manufactured from the material of this invention. These articles are: O-rings, radial shaft seals and gaskets for sealing the plate stack of PEM (Proton Exchange Membrane) fuel cells. Each of these applications will benefit from the advantages of this invention. These include outstanding physical properties, retention of properties in hot air environments, resistance to fluids (particularly hydrocarbon oils), ease of processing and recyclability. A description of each application is now given:

O-RINGS—EXAMPLE 27

A 16 cavity compression mold was used to produce 16 O-rings of 5 different sizes from the material Example 16 in Provisional Patent Application Serial No. 60/168414. The molding cycle consisted of compressing the material at 490° F. for 300 seconds in a 75 ton press and then transferring the tool to a cold (room temperature) press and holding it under pressure for 6 minutes to cool. The OD/ID of the five o-ring sizes made are approximately: 2.1/1.6, 1.9/1.4, 1.7/1.2, 1.5/1.0 and 1.4/0.9 mm/mm respectively. Such o-ring components could be used for general sealing or gasketing applications. A possible use for the o-rings produced form material of Example 16, is, but not necessarily limited to, sealing applications having a continuous use temperature of up to 150° C. and in contact with hydrocarbon based oils.

RADIAL SHAFT SEAL—EXAMPLE 28

A piece compression mold was used to produce a trim lip radial shaft seal on a metal insert ring from the material of Example 4 in Provisional Patent Application Serial No. 60/168414. The tool was preheated to 480° F. and then removed from the press. A metal case insert, which had been pretreated with an amino-silane adhesive, was placed in the mold along with approximately 10 grams of material. The tool was placed back in the press and compacted for 4 minutes at 480° F. Following this, the tool was removed and transferred to a cold (room temperature) press and held under pressure for 6 minutes to cool. Common uses of radial shaft seal include automotive power train systems and industrial motor applications.

PEM FUEL STACK SEALING—EXAMPLE 29

Proton Exchange Membrane (PEM) fuel cells have recently generated a lot of commercial interest because of their potential to power such things as residential and commercial dwellings to transportation vehicles. A PEM fuel cell generates power by an electro-chemical reaction occurring between two or more plates, known as the stack. Sealing these plate stacks is a challenging problem. The seal has to perform at about 100° C., have low permeation to gases, such as air and hydrogen, have resistance to an assortment of heat transfer fluids (for example water and hydrocarbon based oils), have compatibility with an assortment of catalyst systems (for example platinum based catalysts) and have low compression set. In addition, these gaskets are typically very thin which results in processing challenges.

The material of this invention has been compression molded into an approximately 4 inch by 4 inch square framed gasket having a thickness of about 0.70 mm at its thickest portion and 0.20 mm at its thinnest. The material used was that of Example 4 in Patent Application Serial No. 60/168414. Molding was undertaken by preheating the tool to 480° F. and then removing it from the 75 ton press. An approximately 0.035 inch thick piece of material was laid along the cavity of the tool and the tool was placed back in the press. The press cycle consisted of compression for 4 minutes at 480° F. Following this, the tool was removed and transferred to a cold (room temperature) press and held under pressure for 6 minutes cool.

By the term seal-gasket product as used herein it is meant a seal or a gasket member which is used to form a sealing engagement between two or more metal or plastic members (and preferably being metal).

While it will be apparent that the preferred embodiments of the invention disclosed are well calculated to fulfill the objects, benefits, and advantages of the invention, it will be appreciated that the invention is susceptible to modification, variation and change without departing from the proper scope or fair meaning of the subjoined claims.

What is claimed is:

1. A fluorine containing thermoplastic vulcanizate composition comprising a continuous phase of at least one uncured melt formable thermoplastic resin and a blend of at least two cured fluorine containing elastomers where one of the elastomers is a vinylidene fluoride/tetrafluoroethylene/propylene terpolymer,
   wherein the vinylidene fluoride/tetrafluoroethylene/propylene terpolymer comprises between 5 and 95 weight percent of the total dispersed elastomer phase, and the total dispersed elastomer phase comprises from between 40 and 90 weight percent based on the total amount of the continuous phase and the dispersed phase combined, and, the dispersed elastomer phase is not formed from monomer constituents comprised of special cure site monomers.

2. The composition of claim 1, wherein the thermoplastic resin is a terpolymer of tetrafluoroethylene/vinylidene fluoride/hexafluoropropylene.

3. The composition of claim 1, wherein the thermoplastic resin is a copolymer of tetrafluoroethylene/ethylene.

4. The composition of claim 1, wherein the thermoplastic resin is a copolymer of tetrafluoroethylene/hexafluoropropylene.

5. A process for producing a fluorine containing thermoplastic vulcanizate composition, which comprises the steps of:
   (c) melt blending at least one uncured melt formable continuous phase of thermoplastic fluorocarbon resin and a disperse phase of a fluorine containing elastomer blend, wherein the elastomer blend is not formed from monomer constituents having special cure site monomers, where at least one of the elastomeric components elastomers is a vinylidene fluoride/tetrafluoroethylene/propylene terpolymer, and where the elastomers and thermoplastic are melt blended at a temperature higher than the melting temperature of the thermoplastic, and
   (d) then the disperse phase is vulcanized while maintaining the shear mixing forces and the uncured state of the continuous phase.

6. The process according to claim 5, wherein at least one member selected from the group consisting of vulcanizing agents and vulcanization accelerators is added after the melt blending step and before the vulcanizing step.

7. An article made from the composition of claim 1.

8. An article made from the composition of claim 2.

9. An article made from the composition of claim 3.

10. An article made from the composition of claim 4.

11. A seal-gasket product containing an elastomeric TPV composition in sealing engagement between at least two members, said members being selected from the group consisting of metal and plastic, said composition being a dual phase fluorine containing thermoplastic vulcanizate composition comprising a first uncured continuous phase of at least one melt formable thermoplastic resin, and, a second dispersed phase blend of at least two cured fluorine containing elastomers where one of the elastomers is a vinylidene fluoride/tetrafluoroethylene/propylene terpolymer,
    wherein the vinylidene fluoride/tetrafluoroethylene/propylene terpolymer comprises between 5 and 95 weight percent of the total dispersed elastomer phase, and the total disperse elastomer phase comprises from between 40 and 90 weight percent based on the total amount of the continuous phase and the disperse phase combined, and, the dispersed elastomer phase blend is not formed from monomer constituents comprised of special cure site monomers.

12. The product of claim 11, wherein the thermoplastic resin is a terpolymer of tetrafluoroethylene/vinylidene fluoride/hexafluoropropylene.

13. The product of claim 11, wherein the thermoplastic resin is a copolymer of tetrafluoroethylene/ethylene.

14. The product of claim 11, wherein the thermoplastic resin is a copolymer of tetrafluoroethylene/hexafluoropropylene.

15. A seal-gasket product containing an elastomeric TPV composition in sealing engagement between at least two members, said members selected from the group consisting of metal and plastic;
    said composition comprising a dual phase partitioned composition formed from a thermoplastic first phase and a dynamically vulcanized second phase;
    said first phase comprising a continuous uncured fluorocarbon resin;
    said second phase comprising a blend of at least two cured fluorine containing elastomers dispersed throughout said first phase, including a vinylidene fluoride/tetrafluoroethylene/propylene terpolymer comprising between 5 and 95 weight percent of the total dispersed phase;
    the total dispersed elastomeric phase comprises between 40 and 90 weight percent based on the total amount of the continuous phase and the disperse phase combined, wherein the dispersed elastomer phase is formed from chemically unmodified elastomers.

16. A seal-gasket product containing an elastomeric TPV composition, said seal gasket product in sealing engagement between at least two members formed of metal or plastic, said composition comprising a dual phase composition formed from a melt formable uncured continuous first phase and a cured thermoset second phase dispersed throughout said first phase;

said first phase comprising a tetrafluoroethylene/hexafluoropropylene/vinylidene fluoride terpolymer;

said second phase comprising a blend of at least two fluorine containing elastomers, wherein one of the elastomers of the second phase is a vinylidene fluoride/tetrafluoroethylene/propylene terpolymer comprising between 5 and 95 weight percent of the total second phase, said second phase comprising between 40 and 90 weight percent based oh the total amount of the first phase and the second phase combined, wherein the dispersed elastomer phase is not formed from monomer constituents comprised of special cure site monomers;

said first phase substantially non-crosslinked with said second phase.

17. The composition of claim 1 wherein said vinylidene fluoride/tetrafluoroethylene/propylene terpolymer is at least substantially free of a hexafluoropropylene monomer.

18. A process for producing a fluorine containing thermoplastic vulcanizate composition, which comprises the steps of:

(a) melt blending at least one uncured melt formable continuous phase of thermoplastic fluorocarbon resin and a disperse phase of a fluorine containing elastomer blend, wherein the elastomer blend is not formed from monomer constituents having special cure site monomers, wherein at least one of the elastomeric components elastomers is a vinylidene fluoride/tetrafluoroethylene/propylene terpolymer, wherein the elastomer blend contains a curative agent prior to melt blending, and wherein the elastomers and thermoplastic are melt blended at a temperature higher than the melting temperature of the thermoplastic, and (b) then curing the dispersed elastomeric phase while maintaining the shear mixing forces and the uncured state of the continuous phase.

19. A composition formed from the method of claim 18.

20. A fluorine containing thermoplastic vulcanizate composition comprising a continuous phase of at least one uncured melt formable thermoplastic resin and a blend of at least two cured fluorine containing elastomers forming a dispersed phase where one of the elastomers is a vinylidene fluoride/tetrafluoroethylene/propylene terpolymer, wherein the vinylidene fluoride/tetrafluoroethylene/propylene terpolymer comprises between 5 and 95 weight percent of the total dispersed elastomer phase, and the total dispersed elastomer phase comprises from between 40 and 90 weight percent based on the total amount of the continuous phase and the dispersed phase combined, and, the elastomers forming the elastomeric blend are chemically unmodified prior to dispersion within the continuous phase.

* * * * *